Feb. 6, 1923. 1,444,509.
E. KEMP.
VEHICLE WHEEL.
FILED MAY 17, 1919.

Inventor.
Edward Kemp.
By
Stanley Lightfoot.
Attorney.

Patented Feb. 6, 1923.

1,444,509

UNITED STATES PATENT OFFICE.

EDWARD KEMP, OF TORONTO, ONTARIO, CANADA, ASSIGNOR, BY DIRECT AND MESNE ASSIGNMENTS, OF ONE-THIRD TO GEORGE WHITAKER MORLEY AND ONE-THIRD TO CHARLES HEBER RUGGLES, BOTH OF TORONTO, ONTARIO, CANADA.

VEHICLE WHEEL.

Application filed May 17, 1919. Serial No. 297,847.

*To all whom it may concern:*

Be it known that I, EDWARD KEMP, of the city of Toronto, in the county of York, in the Province of Ontario, in the Dominion of Canada, have invented certain new and useful Improvements in Vehicle Wheels; and do hereby declare that the following is a full, clear, and exact description of same.

This invention has reference to means and methods of construction and assembling of wheels, being particularly applicable to metal wheels, and has for its object to provide for the easy assembling and tightening of spokes in such wheels, and the effecting of the compression of resilient cushions located between the spokes and the felloe, or the spokes and the hub, or between the spokes and both the felloe and the hub, where such cushions are so provided, whereby strength and rigidity of the wheel in construction may be obtained, whilst maintaining the desirable resiliency in action, without involving undue complicity or materially adding to the expense of construction.

Further objects subsidiary to or resulting from the aforesaid objects, or from the construction or operation of the invention as it may be carried into effect, will become apparent as the said invention is hereinafter further disclosed.

In carrying the said invention into effect, I may provide the novel construction and arrangement of parts hereinafter described, by way of example, having reference to the accompanying drawing, in which:—

Similar characters of reference indicate similar parts in both figures of the drawing.

Figure 1:
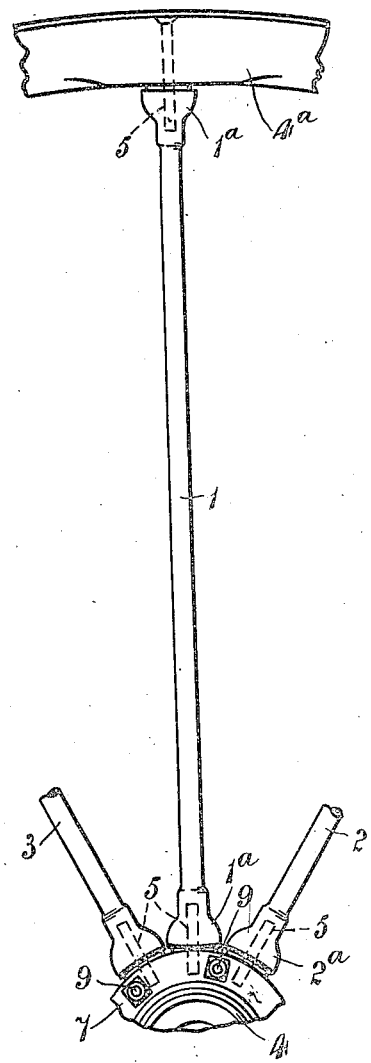
Figure 1 is a fragmentary elevation of a wheel embodying this invention.
Figure 2:
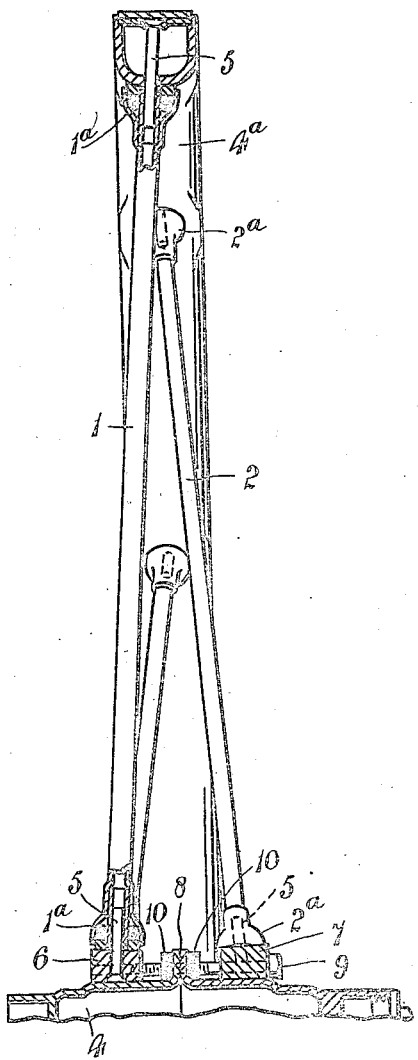
Figure 2 is a transverse section of such a wheel with the lower parts broken away.

In illustrating an embodiment of my invention I have shown the same as applied to an all-metal wheel, to which it is particularly applicable, producing a very rigid structure such as has not been attained in metal wheels as heretofore constructed in which the assembling of the spokes has been effected by riveting, threaded engagement and so-forth, without securing substantial initial compression in the spokes of a wheel.

1, 2, and 3 indicate tubular spokes extending radially from the hub 4 to the felloe 4ª of a wheel, the spokes being shown as being cupped at their ends, as at 1ª, and 2ª, respectively, to accommodate resilient cushions which are adapted to absorb shock between the spokes and the hub and felloe of the wheel and to be substantially compressed when the wheel is assembled. Pins 5 project from the felloe into the outer ends of the said spokes, and from rings or supports 6 and 7 into the inner ends of the said spokes, the said spokes being slidable on the said pins whereby a radially slidable connection for the said spokes is formed.

The rings, or supports, 6 and 7 are slidably mounted, on the said hub, on either side of an intermediate positioning means or flange 8 through which pass bolts 9; the said bolts also passing through one of the said rings and being threaded into the other of the said rings whereby the tightening of the said bolts will effect the drawing together of the said rings towards the intermediate flange 8. Suitable means, such as shims 10, may be employed to limit the closing together of the said rings 6 and 7 to any desired extent, and are preferably adapted to variation to suit requirements, such as by the removal or addition of one or more of the shims, where shims are employed, according to the spacing of the rings 6 and 7 desired when in their closed state. These limiting means may be of a resilient nature.

In assembling a wheel such as that illustrated, the rings 6 and 7 are set as far apart as may be required and the inner ends of the spokes passed over their respective projecting pins on the said rings, the spokes being alternately connected to the said rings 6 and 7, whereby they are staggered, and the upper ends of the spokes are connected with the pins on the felloe; or the said upper ends of the spokes may be brought into their respective positions relevant to the felloe and the pins passed through the felloe into the spokes, where a construction admitting of this is adopted. After the connection of both ends of the spokes, the rings are drawn towards one another by means of the bolts 9, whereby a compression is set up in the said spokes, and the closing of the rings is continued until the desired compression and rigidity of the wheel is attained.

The means determining the extent of inward movement of the said rings may be regulated to suit the extent of movement and the consequent compression of the spokes desired. The connections between the spokes and the felloe, or the spokes and the rings may be slightly flexible, that is, capable of slight angular movement, if desired or may be rigid as to such movement as requirements may dictate.

This invention may be developed within the scope of the following claims without departing from the essential features of the said invention and it is desired that the specification and drawing be read as being merely illustrative and not in a limiting sense, except as necessitated by the prior art.

What I claim as my invention is:—

1. In a wheel, a felloe, a hub, radial pins on said felloe, a plurality of radial spokes slidable on said pins and adjustably supported on said hub, said spokes being initially staggered on said hub to a substantial extent with respect to the plane of said felloe, resilient cushions interposed between said spokes and the parts to which they are connected, and means adapted to reduce the staggering of said spokes and thereby effect the sliding of said spokes over said pins and the compression of said cushions.

2. In a wheel, a felloe, a hub, radial pins on said felloe, a plurality of radial spokes slidable on said pins, adjustable spoke supports arranged on said hub, said supports being initially spaced on either side of the plane of said felloe to a substantial extent and the inner ends of said spokes alternately connected to one or other of said spaced supports, whereby said spokes are staggered, resilient cushions interposed between said spokes and said felloe, and means adapted to reduce the staggering of said spokes and thereby effect the sliding of said spokes over said pins and the compression of said cushions.

3. A vehicle wheel including a felloe, a hub, spokes extending between the hub and felloe, resilient means between an end of the spoke and one of said parts held under compression and means for exerting an outer end-wise compression upon the spokes against the compressed insulating resilient medium, said means for exerting this outer pressure being transverse to the longitudinal axis of the spokes.

4. A vehicle wheel including a hub, felloe and spokes, resilient insulating means held under compression between the opposite ends of the spokes and the felloe and hub, and means for moving the inner ends of the spokes transversely to the longitudinal axes of the spokes whereby to exert stress longitudinally therethrough between the spoke and felloe, further compressing the resilient insulating mediums already under initial compression.

5. A vehicle wheel including a hub, felloe and spokes, resilient insulating means held under compression between the opposite ends of the spokes and the felloe and hub, and pins extending toward each other from the felloe and hub received within the opposite ends of the spokes with which the latter are slidably connected, and means for moving the inner ends of the spokes transversely to the longitudinal axes of the spokes whereby to exert stress longitudinally therethrough between the spoke and felloe, further compressing the resilient insulating mediums already under initial compression.

6. The combination with a hub, felloe and spokes extending from hub to felloe of resilient means between an end of the spokes and one of said parts, rings slidably connected with the opposite ends of the hub and to which the inner ends of the spokes are connected, and means for connecting said rings and for drawing them inwardly toward each other with the effect of forcing the spokes securely between the felloe and hub and further compressing the resilient means at an end of the spokes.

7. The combination with a hub, felloe and spokes of a vehicle wheel, of two rings mounted on the hub, pins extending from the felloe and the rings in a direction toward each other and in axial alignment and received in the opposite ends of the spokes, resilient insulating means held under compression between the opposite ends of the spokes and the felloe, and the rings, and means for forcing the rings inwardly toward each other upon the hub whereby to exert an outward pressure upon the felloe longitudinally of the spokes.

8. The combination with a hub, felloe and spokes of a vehicle wheel, of two rings mounted on the hub, pins extending from the felloe and rings in a direction toward each other and in axial alignment and received in the opposite ends of the spokes, resilient insulating means held under compression between the opposite ends of the spokes and the felloe, and the rings, and means for forcing the rings inwardly toward each other and upon the hub whereby to exert an outward pressure upon the felloe longitudinally of the spokes, said last mentioned means in the form of screws which extend through one ring and are threaded into the other, and a central flange on the hub between the rings through which the screws extend and turn.

Signed at the city of Toronto, in the county of York, in the Province of Ontario, in the Dominion of Canada, this 22nd day of April, 1919.

EDWARD KEMP.